(12) United States Patent
Fukui et al.

(10) Patent No.: US 6,830,783 B2
(45) Date of Patent: Dec. 14, 2004

(54) PROCESS FOR PRODUCING ELECTROMAGNETIC-WAVE ABSORBER

(75) Inventors: Tetsuro Fukui, Kanagawa (JP); Akira Unno, Kanagawa (JP); Yutaka Kagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/397,294

(22) Filed: Mar. 27, 2003

(65) Prior Publication Data

US 2004/0022958 A1 Feb. 5, 2004

Related U.S. Application Data

(62) Division of application No. 09/935,590, filed on Aug. 24, 2001, now abandoned.

(30) Foreign Application Priority Data

Aug. 31, 2000 (JP) .......................... 2000-263504

(51) Int. Cl.[7] .................... B05D 1/04; B05D 5/12
(52) U.S. Cl. .................. 427/475; 427/58; 427/485; 427/384
(58) Field of Search ................. 427/466, 469, 427/470, 471, 475, 485, 202, 205, 58, 384

(56) References Cited

U.S. PATENT DOCUMENTS

| | | | |
|---|---|---|---|
| 4,752,525 A | 6/1988 | Oyachi et al. | 428/323 |
| 5,453,328 A | 9/1995 | Nagano et al. | 428/545 |
| 5,789,064 A * | 8/1998 | Valente et al. | |
| 5,945,213 A * | 8/1999 | Nagaike et al. | |
| 5,952,953 A | 9/1999 | Nikawa et al. | 342/1 |
| 5,976,666 A | 11/1999 | Narang et al. | 428/138 |

* cited by examiner

*Primary Examiner*—Fred J. Parker
(74) *Attorney, Agent, or Firm*—Fitzpatrick, Cella, Harper & Scinto

(57) ABSTRACT

An electromagnetic-wave absorber comprising a base material and an electromagnetic-wave absorption layer provided on the base material. The electromagnetic-wave absorption layer contains at least i) a polymeric material having a glass transition temperature (Tg) of from −15° C. to 110° C. and a number-average molecular weight (Mn) of from 3,000 to 1,000,000 and ii) an inorganic material. Also provided is a process for producing the absorber.

13 Claims, 4 Drawing Sheets

PROCESS FOR PRODUCING ELECTROMAGNETIC-WAVE ABSORBER

This application is a division of application Ser. No. 09/935,590, filed Aug. 24, 2001, now abandoned, which is incorporated herein by reference.

BACKGROUND OF THE INVENTION

1. Field of the Invention

This invention relates to an electromagnetic-wave absorber comprising a base material and fixed thereon particles having electric-wave or electromagnetic-wave absorptivity, and a process for its production. More particularly, this invention relates to an electromagnetic-wave absorber having superior workability and superior handling properties in the shape of paper, and a process for its production.

2. Related Background Art

As electromagnetic-wave absorbers for microwaves and millimeter waves, conventionally used are composite materials of polymers or foamed polymers with magnetic materials such as ferrite particles. Also used are composite materials of polymers with silicon carbide fibers. They, however, have not achieved any sufficient electromagnetic-wave absorptivity over a wide frequency range. An absorber is also devised which is formed of a composite of a polymer with carbon fibers to one side of which an electrically conductive material of aluminum or the like has been stuck. This absorber, however, has had problems that it involves a directionality in its absorptivity and can be made to have a complicated form with difficulty. A composite material of a rubber with a ferrite material has also been put into practical use, which, however, is too heavy to be applicable to constructions with ease. These electromagnetic-wave absorbers are composites of polymers or rubbers with particles or fibers having electromagnetic-wave absorptivity which have been made into composites by some methods, and have had a problem that they require complicated production processes.

A method is also used in which particles having electromagnetic-wave absorptivity are mixed with a coating material or an adhesive and the mixture formed is coated on or applied to necessary portions. According to this method, however, it is difficult to finish its coating or application in uniform characteristics over a wide area of, e.g., room or building walls, and also there is a disadvantage that the coated or applied material tends to come off during use. In addition, a problem is involved such that the quality and the coming-off after coating or application can be managed with difficulty. Also, there is another problem that the mixture is used like a coating material and hence can be recycled with difficulty.

SUMMARY OF THE INVENTION

An object of the present invention is to eliminate the above disadvantages and provide an electromagnetic-wave absorber which can readily be used at portions where electromagnetic-waves must be absorbed, and has an electromagnetic-wave absorption layer on a thin base material which can be recycled with ease.

Another object of the present invention is to provide a process for producing a novel electromagnetic-wave absorber by which an electromagnetic-wave absorption layer can readily be formed on a thin base material which can readily be worked and handled.

The present inventors have made extensive studies on electromagnetic-wave absorbers which can readily be worked and have superior electromagnetic-wave absorptivity. As the result, they have discovered that an electromagnetic-wave absorber having a thin base material provided thereon with an electromagnetic-wave absorption layer containing at least i) a polymeric material having a specific Tg (glass transition temperature) and an Mn (number-average molecular weight) and ii) an inorganic material has superior electromagnetic-wave absorptivity. Thus, they have accomplished the present invention. They also have discovered that such an electromagnetic-wave absorber having superior electromagnetic-wave absorptivity can readily be produced by causing electromagnetic-wave absorption particles to adhere to a thin base material by the aid of static electricity; the particles containing at least a polymeric material and an inorganic material; and heating the particles. Thus, they have accomplished the present invention.

More specifically, the present invention provides an electromagnetic-wave absorber comprising a base material and an electromagnetic-wave absorption layer provided on the base material, wherein;

the electromagnetic-wave absorption layer contains at least i) a polymeric material having a glass transition temperature (Tg) of from −15° C. to 110° C. and a number-average molecular weight (Mn) of from 3,000 to 1,000,000 and ii) an inorganic material.

The present invention also provides an electromagnetic-wave absorber comprising a base material and an electromagnetic-wave absorption layer provided on the base material, wherein;

the electromagnetic-wave absorption layer is a layer formed by:

causing electromagnetic-wave absorption particles to adhere to the base material by the aid of static electricity; the particles containing at least a polymeric material and an inorganic material; and heating the electromagnetic-wave absorption. particles to fix them to the base material.

The present invention further provides a process for producing an electromagnetic-wave absorber comprising:

an adhesion step of causing electromagnetic-wave absorption particles to adhere to a base material by the aid of static electricity; the particles containing at least a polymeric material and an inorganic material; and a fixing step of fixing the electromagnetic-wave absorption particles to the base material by heating, to form an electromagnetic-wave absorption layer.

According to the present invention, an electromagnetic-wave absorber having the shape of thin paper can readily be obtained and also it can be made to have any shape of paper or cloth. Moreover, in the production of the electromagnetic-wave absorber, copying machines and printers utilizing electrophotographic processes can be used, and hence absorbers having a high function can be obtained at a very low cost. As the result, their use on walls or the like of buildings promotes effective utilization of electromagnetic waves in electronic machinery and highly information-oriented society, and this is effective also for removing any obstacles to human bodies caused by electromagnetic waves.

DESCRIPTION OF THE PREFERRED EMBODIMENTS

Figure 1:
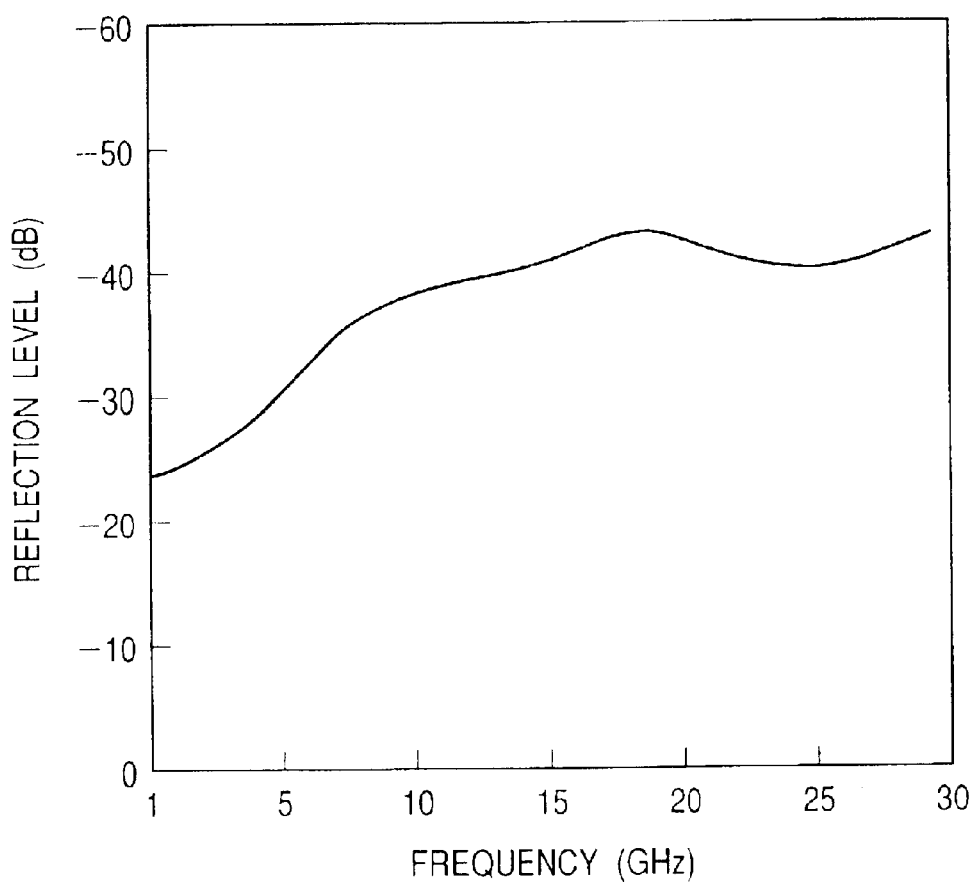
FIG. 1 is a graph showing the relationship between frequency and reflection level of an electromagnetic-wave absorber obtained in Example 1.

The electromagnetic-wave absorber of the present invention consists basically of a base material and an electromagnetic-wave absorption layer provided on the base material. The electromagnetic-wave absorption layer contains at least a polymeric material and an inorganic material.

The base material of the electromagnetic-wave absorber of the present invention may preferably have a thickness of 3 mm or smaller in view of workability, and more preferably 2 mm or smaller. In view of handling properties, it may also preferably have a thickness of 4 $\mu$m or larger, and more preferably 10 $\mu$m or larger. The base material may be formed of one material selected from the group consisting of paper, cloth, plastic film and metal, or may be formed of a plurality of materials (i.e., a composite material).

In order to improve electromagnetic-wave absorptivity, the base material may preferably have an electrically conductive layer. The electrically conductive layer may preferably be a layer containing a metallic material as exemplified by aluminum, titanium or copper foil, any of which may be used. It may also be an oxide layer containing a metal having conductivity, such as an ITO (indium tin oxide) film.

The electromagnetic-wave absorption layer is formed by making electromagnetic-wave absorption particles into a layer by heat fixing. The electromagnetic-wave absorption layer may optionally pattern-wise be formed on the base material. Even when the electromagnetic-wave absorption particles have not any sufficient electromagnetic-wave absorptivity by themselves, they may be laid on the base material in a stated quantity to obtain the electromagnetic-wave absorber of the present invention.

The electromagnetic-wave absorption particles are particles containing at least a polymeric material and an inorganic material, and may be spherical or may be of irregular shape. They may preferably be those which can be handled as powder. The electromagnetic-wave absorption particles may be used in combination of a plurality of types. In such a case, better effects can be obtained when particles of different type are superposed in layers. Also, more improved effects can be obtained when the electromagnetic-wave absorption layer is provided at least partly on each side of the base material. The terms "at least partly" means that the layer is patternwise formed on the base material, but the electromagnetic-wave absorption layer may be provided over the whole surface. In the case when the layer is patternwise formed, it is more preferable for the electromagnetic-wave absorption layer to be formed in such a shape that layers falls at right angles with each other. In the case when particles of different type are superposed in layers, too, the layers may be so formed as to fall at right angles.

The polymeric material used in the electromagnetic-wave absorption layer has a Tg (glass transition temperature) of from –15° C. to 110° C. in view of fixability to the base material. It may preferably have a Tg of from 0° C. to 70° C., and more preferably from 15° C. to 65° C. A material having a Tg lower than –15° C. is unsuitable because any layer construction can not stably be maintained on the base material. Also, one having a Tg higher than 110° C. is undesirable because heat energy is more required to make the electromagnetic-wave absorption particles fix to the base material.

The polymeric material has a number-average molecular weight (Mn) of from 3,000 to 1,000,000. This is because, if it has an Mn lower than 3,000, the particles may have poor durability and stability on the base material and, if it has an Mn higher than 1,000,000, a difficulty may occur in the production of particles and it may be difficult to strip the particles away from the base material, making it hard to recycle the base material.

As to methods of measuring the Tg, it may be measured with a differential scanning calorimeter (DSC). It may be measured at a heating rate of 10° C./minute and according to a temperature-setting pattern prescribed in ASTM D3418-82. From the DSC curve, the point at which the median line of the base line before appearance of an endothermic peak and the base line after appearance of an endothermic peak intersects the rising curve is regarded as the Tg.

The number-average molecular weight is measured by gel permeation chromatography (GPC). The polymeric material is dissolved in a soluble solvent in an amount of 0.05 to 0.6% by weight, and the resultant solution is flowed through columns at a flow rate of 1 ml per minute; the columns being heated in a 40° C. chamber. As standard samples, polystyrene is used to make measurement. For example, they may include samples made by Toyo Soda Manufacturing Co., Ltd. or Pressure Chemical Co. An RI (refractive index) detector is used as a detector.

As the inorganic material, a material having electromagnetic-wave absorptivity is used, including carbon materials as exemplified by carbon black, carbon fibers, graphite and fullerene; magnetic materials as exemplified by ferrite and magnetite, inorganic oxides as exemplified by alumina, zirconia and silica; composite metal oxides as exemplified by lead-lanthanum-zirconium-titanium oxide (PLZT), lead-zirconium-titanium oxide (PZT), barium titanate and strontium titanate; and also silicon carbide and silicon nitride. Particularly preferred are magnetic materials such as ferrite and magnetite. These materials may be porous. A mixture of any of these may also be used.

In the electromagnetic-wave absorption particles, the polymeric material and the inorganic material may preferably be in a compositional ratio by weight of from 30:1 to 1:5.

Besides these materials, a charge control agent may be used as an additive to the electromagnetic-wave absorption particles.

The electromagnetic-wave absorption particles of the electromagnetic-wave absorber of the present invention must be layered on the base material in an amount of at least 1.0 mg/cm$^2$, preferably from 1.0 mg/cm$^2$ to 20,000 mg/cm$^2$, and more preferably from 1.4 mg/cm$^2$ to 1,000 mg/cm$^2$. Electromagnetic-wave absorption particles less than 1.0 mg/cm$^2$ are undesirable because the absorber can not have any sufficient electromagnetic-wave absorptivity and the carbon and/or other inorganic material(s) must be used in a larger compositional ratio in order to ensure the electromagnetic-wave absorptivity, resulting in a poor adhesion onto the base material. On the other hand, electromagnetic-wave absorption particles more than 20,000 mg/cm² may make it difficult to carry out thermal adhesion and make it difficult to obtain the electromagnetic-wave absorber in the desired form.

The electromagnetic-wave absorber of the present invention may also have an adhesive layer in contact with the base material. This layer is used to fasten the absorber to electronic instruments and so forth. The absorber may have a layer construction of base material/adhesive layer/release layer. The adhesive layer may be present over the whole surface or partially.

The electromagnetic-wave absorber of the present invention may be produced by the process as described below.

Step (1): The electromagnetic-wave absorption particles are layered on the base material by the aid of static electricity.

The electromagnetic-wave absorption particles layered on the base material are softened by heat to form an electromagnetic-wave absorption layer, which is then fixed on the base material. As an example of the step (1), a method is available in which the surface of the base material is uniformly or imagewise electrostatically charged and thereafter the electromagnetic-wave absorption particles are laid on the base material by the aid of the Coulomb force. As another method, a method may be employed in which the static electricity is provided on another base member which is more readily charge-controllable, the electromagnetic-wave absorption particles are laid on this base member by the aid of the Coulomb force, and thereafter the particles are transferred to the base material used in the present invention. Such a base member may be in the shape of a sheet, a belt or a drum. It is preferable for its surface to have been surface-treated so that the particles once adhere thereto but can be transferred therefrom with ease. The base member may preferably have a surface having a contact angle to water of 60 degrees or greater, and preferably 70 degrees or greater. As methods for its surface treatment, a method may be employed in which, e.g., a layer having Teflon particles dispersed therein is formed on the surface.

As methods by which the electromagnetic-wave absorption particles laid on the base member are transferred to the base material used in the present invention, it includes a method in which the former base member and the latter base material are brought into contact with each other, and a method in which the particles are or the layer of the particles is transferred by applying an electric field.

As methods of charging the particles electrostatically, a method utilizing triboelectric charging is commonly used. Any other method may also be used. As methods for the triboelectric charging, the particles may be charged by using only the electromagnetic-wave absorption particles like that in one-component development in electrophotography, or may be charged by two-component charging making use of additional carrier powder for charging. As the carrier powder, usable are ferromagnetic metal powders such as iron powder, cobalt powder and nickel powder. The electromagnetic-wave absorption particles may preferably be charged in a quantity of at least 1 mC/kg. If they are charged in a quantity smaller than 1 mC/kg, it may be difficult to layer the particles on the base material by the aid of static electricity. It may especially be more difficult to lay the particles patternwise.

The electromagnetic-wave absorption particles used in the production process of the present invention may preferably have an average particle diameter of from 2 to 15 μm. In the present invention, the average particle diameter of the electromagnetic-wave absorption particles is meant to be the average particle diameter measured by the following measuring method.

(Measurement of Average Particle Diameter)

It may be measured by various methods using Coulter Counter Model TA-II or Coulter Multisizer (manufactured by Coulter Electronics, Inc.). From 2 to 20 mg of electromagnetic-wave absorption particles are added to from 100 to 150 ml of an aqueous 1% sodium chloride solution containing from 0.1 to 5 ml of a surface-active agent (preferably alkylbenzenesulfonate). The resultant mixture is dispersed for about 1 minute to about 3 minutes by means of an ultrasonic dispersion machine. Using the above instrument, the number distribution is calculated using an aperture of 100 μm to determine number-average particle diameter.

Step (2): The electromagnetic-wave absorption particles thus layered on the base material are heated to fix them to the base material.

As methods for the heat fixing in the step (2), it is common to use a method in which they are fixed under application of pressure between heated rollers. A method may also be employed in which they are made to pass through the interior of a heated oven. Hot air may be blown on the layered particles, or microwaves may be applied thereto. In the present invention, there are no particular limitations on the methods, provided that the electromagnetic-wave absorption particles must be heated to a temperature not lower than their Tg, and may preferably be heated to a temperature of Tg+20° C.

The paper-shaped electromagnetic-wave absorber of the present invention can be worked into any desired shape. Also, the absorber may be provided with an adhesive layer on its one side so that it can be used in such a manner that it is readily stuck to portions where electromagnetic-waves must be absorbed. Such function is attributable to the electromagnetic-wave absorptivity of the carbon and/or other inorganic material(s) formed on the paper, plastic film or metal sheet having a thin electrically conductive layer. The term "paper-shaped" means that a photograph or picture can be printed on the surface of the absorber itself and the absorber can be used as if it is handled like a sheet of paper, and also that it may be used as a sheet superposed, for example, on wall paper used in daily life and can be used in the field where paper products are used at present. Also, the thickness of the electromagnetic-wave absorption layer can readily be changed in accordance with any required electromagnetic-wave absorptivity. Still also, an electromagnetic-wave absorber the electromagnetic-wave absorption layer of which consists of a carbon type absorption layer and other inorganic material type absorption layer which are layered as plural layers is a preferred embodiment in the present invention.

As methods of peeling the electromagnetic-wave absorption layer to recycle the base material and so forth, a method may be used in which a surface-active agent is coated and the layer is heated and peeled.

EXAMPLES

The present invention is described below in greater detail by giving Examples.

Example 1

15 parts by weight of ferrite powder with an average particle diameter of 60 nm and 85 parts by weight of styrene-butyl methacrylate copolymer (Tg: 63° C.; Mn: 12,000; styrene/butyl methacrylate copolymerization ratio:

8/2) were kneaded, followed by pulverization, classification and surface-treatment with a charge control agent to obtain electromagnetic-wave absorption particles with an average particle diameter of 10.5 μm. A cylindrical drum having a photo-semiconductor layer on its surface (surface contact angle to water: 80 degrees) was charged to positive polarity by corona charging. The electromagnetic-wave absorption particles were charged to negative polarity by charging them triboelectrically with negatively chargeable ferrite particles, and thereafter caused to adhere to the charged drum by the aid of electrostatic adsorption force. The electromagnetic-wave absorption particles standing adhered to the cylindrical drum were electrostatically transferred to a sheet of paper of 0.5 mm thick to one side of which aluminum foil of 0.2 mm thick had been stuck. The resultant sheet was passed between fixing rollers at a speed of 5 mm/second; the rollers having a nip width of 1 mm and being kept heated to 150° C. Thus, the electromagnetic-wave absorption particles were fixed onto the aluminum foil of the paper to form an electromagnetic-wave absorption layer to obtain an electromagnetic-wave absorber. The electromagnetic-wave absorption layer of the electromagnetic-wave absorber thus obtained was in a weight per unit area of 25 mg/cm$^2$.

To examine the electromagnetic-wave absorptivity of this paper-shaped electromagnetic-wave absorber, the electromagnetic-wave absorptivity was measured by the reflective-electric-power method in an electromagnetic-wave dark room, within the range of frequencies of from 1 GHz to 30 GHz. In the measurement, electromagnetic waves emitted from an oscillator were narrowed down on a paper-shaped electromagnetic-wave absorber of 1 m in length and breadth through a convex lens made of Teflon, in such a way that their spot diameter comes to about five times the wavelength on the surface of the electromagnetic-wave absorber. The electromagnetic waves thus narrowed down were applied to the surface of the electromagnetic-wave absorption layer of the electromagnetic-wave absorber produced as described above. The output power for measurement was 5 mW. The electromagnetic waves reflecting from the electromagnetic-wave absorber were guided into a system constituted of a receiving antenna having the same convex lens as the above and a horn, an amplifier and a spectrum analyzer, and the intensity of electromagnetic waves reflecting from the electromagnetic-wave absorber of the present invention was measured with this system. The result is shown in FIG. 1.

Figure 2:
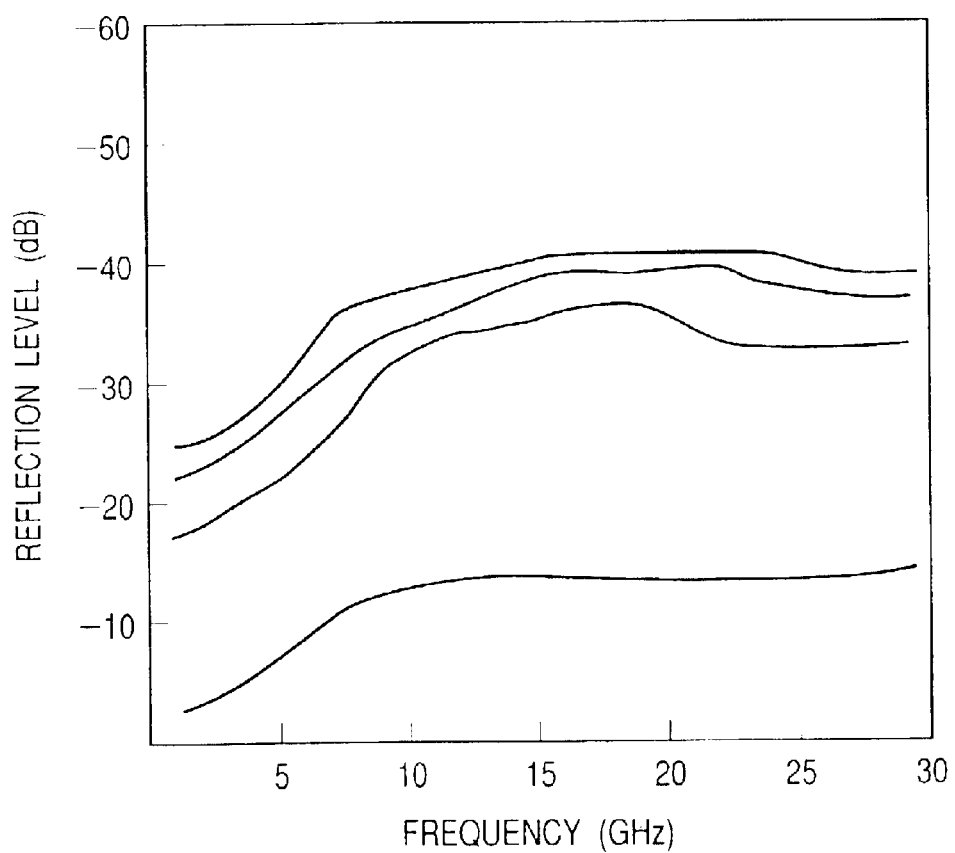
FIG. 2 is a graph showing the relationship between frequency and reflection level of a case in which the weight of a electromagnetic-wave absorption layer was changed in the electromagnetic-wave absorber obtained in Example 1.

As the result, as shown in FIG. 1, values better than −20 dB were obtained on the reflection level of electromagnetic waves, within the range of from frequencies of from 1 GHz to 30 GHz. Thus, it was ascertained that the electromagnetic-wave absorber produced as described above stood endowed with electromagnetic-wave absorptivity. Here, the relationship between the weight per unit area and the electromagnetic-wave absorptivity of the electromagnetic-wave absorption layer formed on the surface was examined to reveal that, as shown in FIG. 2, in all the frequency region the electromagnetic-wave absorptivity became higher with an increase in the weight of the electromagnetic-wave absorption layer. In FIG. 2, the graph shows the results of the measurement of absorptivity with changes in weight of the electromagnetic-wave absorption layer to 1.0 mg/cm$^2$, 1.5 mg/cm$^2$, 10 mg/cm$^2$ and 100 mg/cm$^2$ (corresponding sequentially to the four curves in order from the bottom in the graph). For comparison, using aluminum plates (thickness: 0.2 mm) having the same area (1 m×1 m) as the above, the intensity of electromagnetic waves reflecting therefrom was also measured.

Alumina, zirconia, PLZT, PZT, silicon carbide, silicon nitride and SiO$_2$ powders were each used in place of the ferrite powder to test similarly. As the result, like effects were ascertained.

Figure 3:
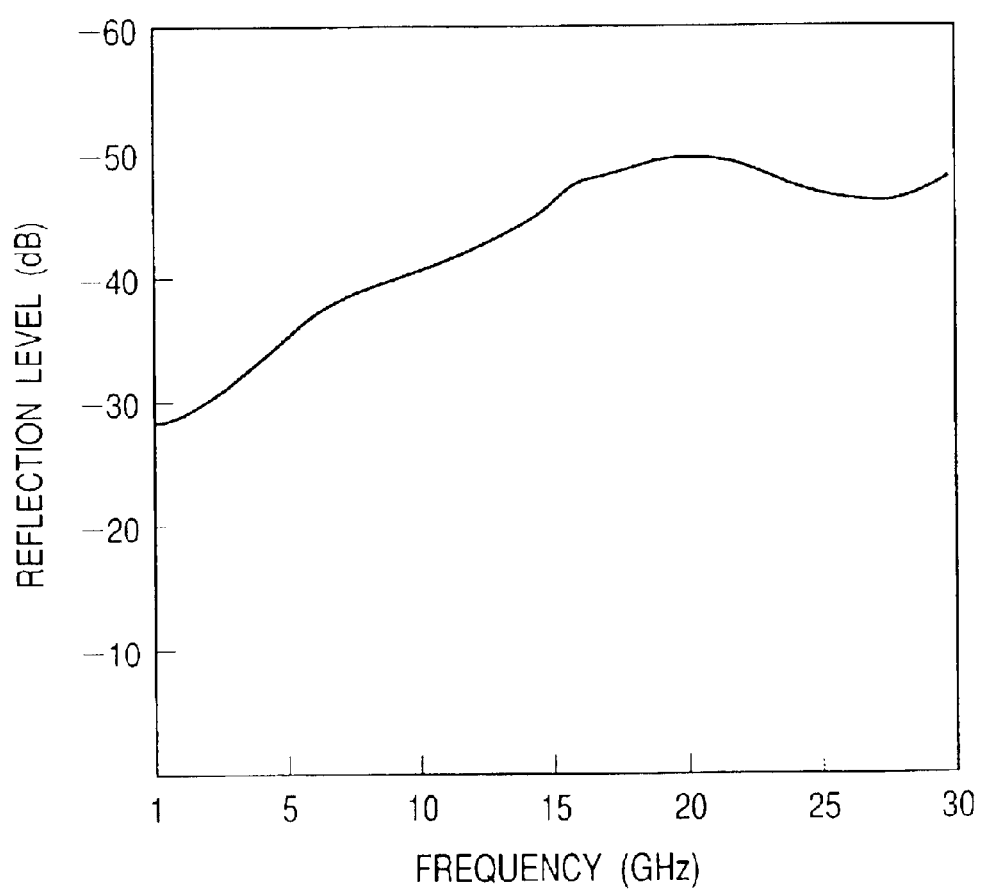
FIG. 3 shows an example in which the electromagnetic-wave absorber has an aluminum metallized layer and a PET layer in Example 1.

By the same production process as the above, an electromagnetic-wave absorption layer was formed on a 100 μm thick PET (polyethylene terephthalate) film having on its one side a layer formed by metallization of aluminum in a thickness of 1 μm. The electromagnetic-wave absorptivity of the paper-shaped electromagnetic-wave absorber thus obtained was measured in the same manner as the above method. As the result, the results shown in FIG. 3 were obtained, which proved that the same effects were obtainable both in the case when the base material was paper and in the case when it was plastic.

As shown above, a great electromagnetic-wave absorptivity was attained in all the frequency region, on account of the effect attributable to the particles having electromagnetic-wave absorptivity, layered on the base material surface. This proved the advantageous effect of the present invention.

Incidentally, the electromagnetic-wave absorption particles containing ferrite or the like may preferably uniformly be deposited on the base material. However, the same effect as the above was obtainable also when the part of the electromagnetic-wave absorption layer was formed in any pattern and the pattern was composed of elements repeated in regular arrangement or arranged at random, as long as the electromagnetic-wave absorption layer was so formed as to cover at least 45% of the whole area of the base material surface to which the electromagnetic waves were applied.

Example 2

Figure 4:
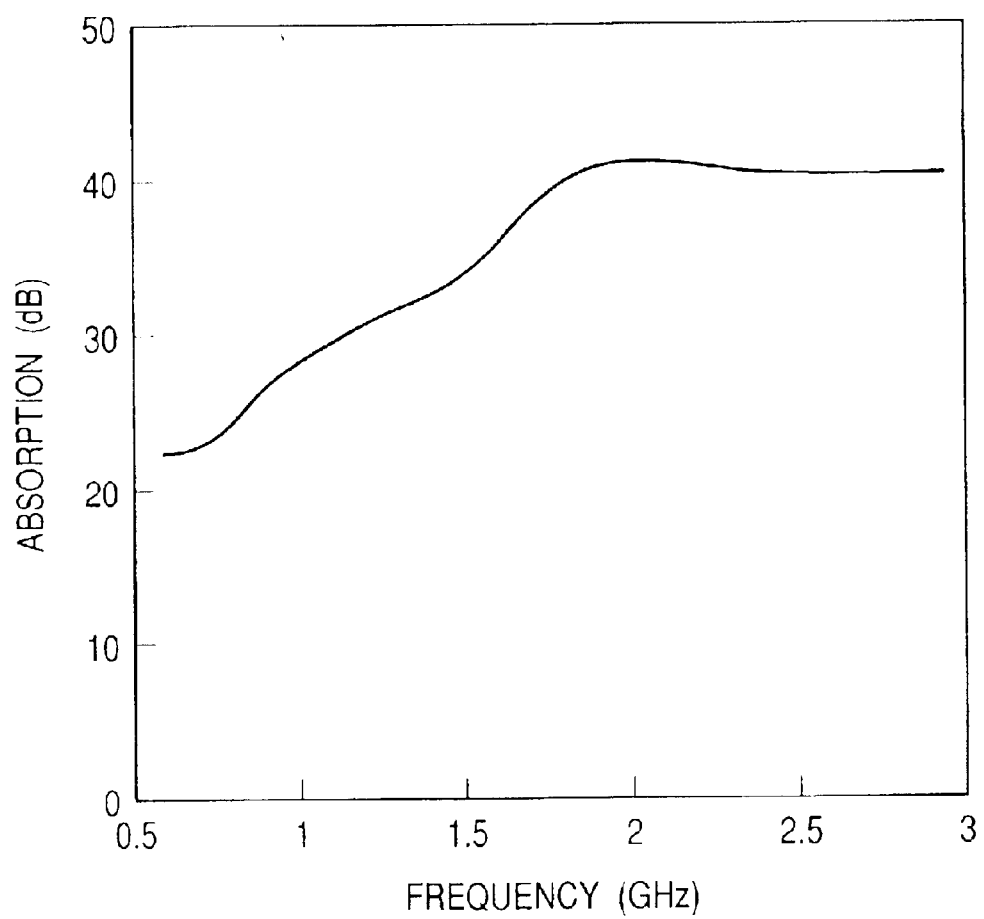
FIG. 4 is a graph showing the relationship between frequency and reflection level of an electromagnetic-wave absorber obtained in Example 2.

10 parts by weight of carbon powder and 80 parts by weight of polyester resin (Tg: 52° C.; Mn: 6,500) were kneaded to obtain electromagnetic-wave absorption particles with an average particle diameter of 9.5 μm. An electromagnetic-wave absorber was produced in the same manner as in Example 1 except that 1 mm thick woodfree paper to one side of which aluminum foil of 100 μm thick had been stuck was used as the base material. Also, this base material used was a base material provided previously with an adhesive layer and a release paper on the surface of its paper side so as to be able to make a bag in a post-step. The electromagnetic-wave absorption layer was formed on the surface of the paper side in a weight of 4.9 mg/cm$^2$. The absorption of electromagnetic waves in the frequency range of 0.5 GHz to 3 GHz was measured in the same manner as in Example 1 to ascertain that the absorber had electromagnetic-wave absorptivity as shown in FIG. 4.

Next, using this electromagnetic-wave absorber, a bag having a side length of 200 mm was prepared. An oscillator having an oscillating frequency of 100 MHz, 1 GHz or 3 GHz and an output power of 500 mW was put in the bag thus prepared. At a place 1 m distant from the bag, the electric field intensity was −22 dB. In the cases of devices whose electric field intensity was measured at 1 GHz and 3 GHz, it was at a level equal to external noise levels or below. Thus, it was ascertained that the absorber had a sufficient electromagnetic-wave absorptivity.

In addition, this paper-shaped electromagnetic-wave absorber was also coated with an adhesive on the surface of its aluminum foil side, and was stuck to a wall of a room of about 20 m$^2$ in area, assumed as a sham office space. In this room, propagation of electromagnetic waves was tested using electromagnetic waves having an output power of 500 mW and a frequency of 1 GHz. As a result, no influence was seen on computers and measuring instruments kept apart by 50 cm or more from the outside wall. Thus, the effect of the electromagnetic-wave absorber of the present invention was proved. Also, communication with a wireless LAN (local-area network) system using a frequency of 1 GHz was tried in the outside of the room, but no problem came about at all.

Example 3

Using electromagnetic-wave absorption particles 1 comprised of styrene-hexyl methacrylate copolymer (Tg: 55° C.; Mn: 32,000; styrene/hexyl methacrylate copolymerization ratio: 85/15) incorporated with ferrite particles and electromagnetic-wave absorption particles 2 comprised of polyester resin (Tg: 53° C.; Mn: 9,500) incorporated with carbon particles, an electromagnetic-wave absorption layer having a pattern of a lattice was formed by the same process as in Example 1. More specifically, a lengthwise pattern 2-1 of the lattice was formed using the electromagnetic-wave absorption particles 2 and a crosswise pattern 1-1 of the lattice was formed thereon using the electromagnetic-wave absorption particles 1. Next, on the pattern 1-1, a lengthwise pattern 2-2 of the lattice was formed using the electromagnetic-wave absorption particles 2 and a crosswise pattern 1-2 of the lattice was formed thereon using the electromagnetic-wave absorption particles 1. Next, on the pattern 1-2, a lengthwise pattern 2-3 of the lattice was formed using the electromagnetic-wave absorption particles 2 and a crosswise pattern 1-3 of the lattice was formed thereon using the electromagnetic-wave absorption particles 1. The patterns 2-1, 2-2 and 2-3 stood superposed completely when viewed from the top. The patterns 1-1, 1-2 and 1-3 stood superposed completely when viewed from the top. The patterns formed were each in a line width of 150 $\mu$m and a line-to-line space of 100 $\mu$m, and were each in a coating weight of 18 mg/cm$^2$. The electromagnetic-wave absorber thus obtained was evaluated in the same manner as in Example 1, where a value beyond −30 dB was obtained and it was ascertained that the absorber had been endowed with good electromagnetic-wave absorptivity.

Example 4

An electromagnetic-wave absorber was produced in the same manner as in Example 3 except that magnetite particles were used in place of the ferrite particles to prepare electromagnetic-wave absorption particles 1. Its electromagnetic-wave absorptivity was measured to ascertain that it had good electromagnetic-wave absorptivity like the case of the ferrite particles.

Reference Example 1

Electromagnetic-wave absorbers were produced in the same manner as in Example 1 except that α-methylstyrene-methyl methacrylate copolymer (Tg: 115° C.; Mn: 25,000) was used in place of the polymeric material used therein. Their electromagnetic-wave absorptivity was measured to ascertain that they had good electromagnetic-wave absorptivity like the case of Example 1, but had a problem that the electromagnetic-wave absorption layer having a weight per unit area of 100 mg/cm$^2$ or more partly came off after its leaving for a long period of time probably because it had an inferior film strength.

Reference Example 2

An electromagnetic-wave absorber having an electromagnetic-wave absorption layer was produced in the same manner as in Example 1 except that polypropylene (Tg: −18° C.) was used in place of the polymeric material used therein. This electromagnetic-wave absorber showed an electromagnetic-wave absorptivity, but any values better than −25 dB were not obtainable in respect of the reflection level of electromagnetic waves in the region of from 1 GHz to 30 GHz.

The electromagnetic wave reflectance was improved by increasing the weight of the electromagnetic-wave absorption layer per unit area. However, the improvement was not remarkable. It was presumed that this is due to the ferrite particles not being uniformly dispersed in the polypropylene. Accordingly, electromagnetic-wave absorption particles were prepared under stronger dispersion conditions. As a result, the absorber obtained had an improved electromagnetic-wave absorptivity of up to −30 dB, but showed instability over time, and thus had a low performance.

What is claimed is:

1. A process for producing an electromagnetic-wave absorber comprising:

an adhesion step of causing electromagnetic-wave absorption particles, which contain at least a polymer material and an inorganic material, to adhere to a base member by electrostatic deposition;

a transferring step of transferring the electromagnetic-wave absorption particles laid on the base member to a base material; and a fixing step comprising softening the electromagnetic-wave absorption particles by heating and fixing them to the base material, to form an electromagnetic-wave absorption layer.

2. The process for producing an electromagnetic-wave absorber according to claim 1, wherein the polymer material has a glass transition temperature Tg of from −15° C. to 110° C. and a number-average molecular weight Mn of from 3,000 to 1,000,000.

3. The process for producing an electromagnetic-wave absorber according to claim 2, wherein the polymer material has a glass transition temperature Tg of from 0° C. to 70° C.

4. The process for producing an electromagnetic-wave absorber according to claim 1, wherein said inorganic material is a material selected from the group consisting of an inorganic carbon material, a magnetic material, an inorganic oxide, a composite metal oxide, silicon carbide, and silicon nitride.

5. The process for producing an electromagnetic-wave absorber according to claim 1, wherein said base material has an electrically conductive layer on its surface, and said electromagnetic-wave absorption layer is provided on the electrically conductive layer of the base material.

6. The process for producing an electromagnetic-wave absorber according to claim 1, wherein said electromagnetic-wave absorption layer has a weight per unit area of 1.0 mg/cm$^2$ or more.

7. The process for producing an electromagnetic-wave absorber according to claim 1, wherein said electromagnetic-wave absorption layer has a weight per unit area from 1.0 mg/cm$^2$ to 20,000 mg/cm$^2$.

8. The process for producing an electromagnetic-wave absorber according to claim 1, wherein said base material is formed of a material selected from the group consisting of paper, cloth, plastic, and metal.

9. The process for producing an electromagnetic-wave absorber according to claim 1, wherein said base material has an adhesive portion at least partly on its surface.

10. The process for producing an electromagnetic-wave absorber according to claim 1, wherein said base material has the electromagnetic-wave absorption layer at least partly on two of its surfaces.

11. The process for producing an electromagnetic-wave absorber according to claim 1, wherein said electromagnetic-wave absorption layer comprises two or more different electromagnetic-wave absorption layers superposed on said base material.

12. The process for producing an electromagnetic-wave absorber according to claim 1, wherein said electromagnetic-wave absorption particles have an average particle diameter of from 2 $\mu$m to 15 $\mu$m.

13. The process for producing an electro-magnetic wave absorber according to claim 1, wherein the electro-magnetic wave absorber layer is formed in a pattern to cover at least 45% of an entire surface of the base material.

* * * * *